United States Patent
Nakanishi et al.

(10) Patent No.: US 7,392,154 B2
(45) Date of Patent: Jun. 24, 2008

(54) STORAGE MEDIUM HAVING GAME PROGRAM STORED THEREON AND GAME APPARATUS

(75) Inventors: Keigo Nakanishi, Kyoto (JP); Hiroshi Matsunaga, Kyoto (JP); Shinichi Ikematsu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 176 days.

(21) Appl. No.: 11/266,373

(22) Filed: Nov. 4, 2005

(65) Prior Publication Data

US 2006/0121985 A1 Jun. 8, 2006

(30) Foreign Application Priority Data

Nov. 19, 2004 (JP) .............................. 2004-336360

(51) Int. Cl.
*A63F 9/24* (2006.01)

(52) U.S. Cl. ...................................................... 702/155

(58) Field of Classification Search .................. 702/155
See application file for complete search history.

(56) References Cited

U.S. PATENT DOCUMENTS

2003/0186741 A1* 10/2003 Hayashida et al. ............ 463/31

FOREIGN PATENT DOCUMENTS

JP 11-53115 2/1999

OTHER PUBLICATIONS http://mw1.merriam-webster.com/dictionary/reset, p. 1.*

* cited by examiner

*Primary Examiner*—Tung S Lau
(74) *Attorney, Agent, or Firm*—Nixon & Vanderhye P.C.

(57) ABSTRACT

Reference coordinates in a coordinate system and designated coordinates in the coordinate system based on coordinate information outputted by a pointing device are set. A distance and direction between the reference coordinates and the designated coordinates are calculated. When the distance has a value smaller than a predetermined threshold value, the distance is converted into a game parameter using a first conversion function is determined. On the other hand, when the distance has a value greater than the predetermined threshold value, the distance is converted into a game parameter using a second conversion function for converting the distance into a value greater than a value into which the distance is converted using the first conversion function. The game is processed using the direction and the game parameter.

11 Claims, 14 Drawing Sheets

F I G. 1 4
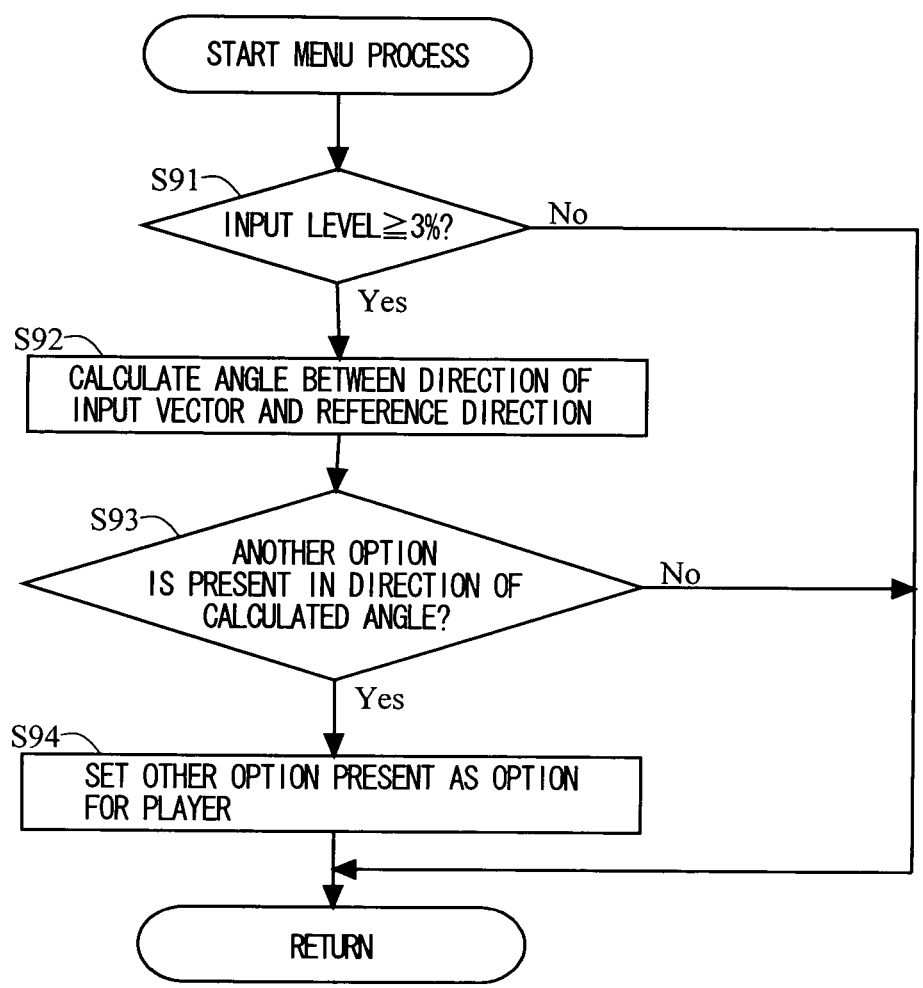

STORAGE MEDIUM HAVING GAME PROGRAM STORED THEREON AND GAME APPARATUS

BACKGROUND

1. Technical Field

The exemplary illustrative embodiment presented herein relates to a storage medium having a game program stored thereon and a game apparatus, and more particularly to a storage medium having stored thereon a game program for use with a computer game for which a pointing device such as a touch panel is employed and a game apparatus.

2. Description of the Background Art

Conventionally, well known is an input method in which an input magnitude and an input direction are determined based on coordinates designated by a pointing device. An input device operated using a touch panel by a player is developed as disclosed in, for example, Japanese Laid-Open Patent Publication No. 11-53115 (hereinafter, referred to as Patent Document 1). As shown in FIG. 3 of Patent Document 1, the input device as disclosed in Patent Document 1 determines a movement direction and a movement distance of a cursor based on a direction and distance between the center of the touch panel and touch coordinates at which the player touches the touch panel.

However, since the input device disclosed in Patent Document 1 calculates a direction and a distance between the center of the touch panel and touch coordinates according to a touch-operation of a player so as to determine two parameters (the direction and the movement distance), it is impossible for the player to specify only one of the parameters (for example, the direction) through the touch-operation using the input device. Further, since the input device determines a movement distance according to a distance between the center of the touch panel and touch coordinates, the player cannot slightly adjust the movement distance.

SUMMARY

Therefore, a feature of the exemplary illustrative embodiment presented herein is to provide a storage medium having stored thereon a game program and a game apparatus for enabling a player to control a pointing device by using one parameter desired by the player or enabling a player to make a slight adjustment on the pointing device.

The exemplary illustrative embodiment presented herein has the following features to attain the object mentioned above. The reference numerals, step numbers (a step is abbreviated as S and only a step No. is indicated), and the like in the parentheses indicate the correspondence with the embodiment described below in order to aid in understanding the exemplary illustrative embodiment and are not intended to limit, in any way, the scope of the exemplary illustrative embodiment.

A first aspect of the exemplary illustrative embodiment presented herein is directed to a storage medium having stored thereon a game program executed by a computer (21) in a game apparatus (1) which is operated using a pointing device (13). The pointing device outputs coordinate information based on a given coordinate system according to an operation of a player. The game program causes the computer to execute: a reference coordinate setting step (S53); a reference coordinate storage step (S53); a designated coordinate setting step (S54); a calculation step (S55); a first game parameter determination step (S57, S72, S73, and operation instruction areas Z4 shown in FIGS. 6 to 8); a second game parameter determination step (S57, S72, S73, and operation instruction areas Z2 and Z3 shown in FIGS. 6 to 8); and a game process step (S74 and S60). The reference coordinate setting step sets reference coordinates (reference position) in the coordinate system. The reference coordinate storage step stores the reference coordinates. The designated coordinate setting step sets designated coordinates (touch position) in the coordinate system based on the coordinate information outputted by the pointing device. The calculation step calculates a distance (input distance D) and a direction (input direction) from the reference coordinates to the designated coordinates. The first game parameter determination step converts, when the distance calculated in the calculation step has a value smaller than a predetermined threshold value, the distance into a game parameter (movement distance M) using a first conversion function (FIGS. 5 and 6). The second game parameter determination step converts, when the distance calculated in the calculation step has a value greater than the predetermined threshold value (10 dots or 21 dots for "mode1" or 16 dots or 32 dots for "mode2" as shown in FIG. 6), the distance into a game parameter (movement distance M) using a second conversion function for converting the distance into a value greater than a value into which the distance is converted using the first conversion function (FIGS. 5 and 6). The game process step performs a game process using a direction calculated in the calculation step and one of the game parameter determined in the first game parameter determination step and the game parameter determined in the second game parameter determination step. The pointing device is an input device for designating an input position or coordinates on a screen, such as a touch panel, a mouse, a track pad, or a track ball. The coordinate system used in each input device is a touch panel coordinate system or a screen coordinate system.

In a second aspect based on the first aspect, when the distance calculated in the calculation step has a value smaller than the predetermined threshold value (4 to 10 dots for "mode1" and 4 to 16 dots for "mode2" as shown in FIG. 6), the first game parameter determination step converts the distance calculated in the calculation step into zero using the first conversion function to determine the game parameter as zero (M=0).

In a third aspect based on the second aspect, the game process step performs the process using both the game parameter into which the distance is converted and the direction calculated in the calculation step when the distance calculated in the calculation step has a value greater than the predetermined threshold value (10 dots or more for "mode1" and 16 dots or more for "mode2" as shown in FIG. 6) (operation instruction areas Z3 to Z5). The game process step performs the process using only the direction calculated in the calculation step when the distance calculated in the calculation step has a value smaller than the predetermined threshold value (operation instruction area Z2).

In a fourth aspect based on the first aspect, the game parameter into which the distance calculated in the calculation step is converted using the second conversion function, has a greater rate of change per unit distance (a gradient used for the section of 21 to 36 dots for "mode1" and a gradient used for the section of 32 to 48 dots for "mode2" as shown in FIG. 6) than the game parameter into which the distance calculated in the calculation step is converted using the first conversion function which uses, as a rate of change of the game parameter per unit distance, a gradient used for the section of 10 to 21 dots for "mode1" and a gradient used for the section of 16 to 32 dots for "mode2" as shown in FIG. 6.

In a fifth aspect based on the first aspect, the first conversion function used in the first game parameter determination step is a function for multiplying the distance calculated in the calculation step by a first positive value, thereby converting the distance into the game parameter. The second conversion function used in the second game parameter determination step is a function for multiplying the distance calculated in the calculation step by a second positive value greater than the first positive value, thereby converting the distance in the game parameter.

In a sixth aspect based on the first aspect, the first conversion function used in the first game parameter determination step is a function for multiplying the distance calculated in the calculation step by a first positive value, thereby converting the distance into the game parameter. The second conversion function used in the second game parameter determination step is a function for adding a value obtained by multiplying the threshold value by the first positive value to a value obtained by multiplying the second positive value greater than the first positive value by a value obtained by subtracting the threshold value from the distance calculated in the calculation step, thereby converting the distance into the game parameter.

In a seventh aspect based on the first aspect, the game process step determines a movement speed of a game object appearing in a virtual game space according to the game parameter (S74).

In a eighth aspect based on the first aspect, the game process step determines a direction of a game object appearing in a virtual game space according to the direction calculated in the calculation step (S82).

In a ninth aspect based on the first aspect, the reference coordinate setting step sets, as the reference coordinates, designated coordinates which are initially set in the designated coordinate setting step.

A tenth aspect of the exemplary illustrative embodiment presented herein is directed to a game apparatus which is operated using a pointing device. The pointing device outputs coordinate information based on a given coordinate system according to an operation of a player. The game apparatus comprises: a reference coordinate setting means; a reference coordinate storage means; a designated coordinate setting means; a calculation means; a first game parameter determination means; a second game parameter determination means; and a game process means. The reference coordinate setting means sets reference coordinates in the coordinate system. The reference coordinate storage means stores the reference coordinates. The designated coordinate setting means sets designated coordinates in the coordinate system based on the coordinate information outputted by the pointing device. The calculation means calculates a distance and a direction from the reference coordinates to the designated coordinates. The first game parameter determination means converts, when the distance calculated by the calculation means has a value smaller than a predetermined threshold value, the distance into a game parameter using a first conversion function. The second game parameter determination means converts, when the distance calculated by the calculation means has a value greater than the predetermined threshold value, the distance into a game parameter using a second conversion function for converting the distance into a value greater than a value into which the distance is converted using the first conversion function. The game process means performs a game process using the direction calculated by the calculation means and one of the game parameter determined by the first game parameter determination means and the game parameter determined by the second game parameter determination means.

An eleventh aspect of the exemplary illustrative embodiment presented herein is directed to a storage medium having stored thereon a program executed by a computer in an information processing apparatus which is operated using a pointing device. The pointing device outputs coordinate information based on a given coordinate system according to an operation of a user. The program causes the computer to execute: a reference coordinate setting step; a reference coordinate storage step; a designated coordinate setting step; a calculation step; a first parameter determination step; a second parameter determination step, and an operation process step. The reference coordinate setting step sets reference coordinates in the coordinate system. The reference coordinate storage step stores the reference coordinates. The designated coordinate setting step sets designated coordinates in the coordinate system based on the coordinate information outputted by the pointing device. The calculation step calculates a distance and a direction from the reference coordinates to the designated coordinates. The first parameter determination step converts, when the distance calculated in the calculation step has a value smaller than a predetermined threshold value, the distance into a parameter using a first conversion function. The second parameter determination step converts, when the distance calculated in the calculation step has a value greater than the predetermined threshold value, the distance into a parameter using a second conversion function for converting the distance into a value greater than a value into which the distance is converted using the first conversion function. The operation process step processes an operation using the direction calculated in the calculation step and one of the parameter determined in the first parameter determination step and the parameter determined in the second parameter determination step.

According to the first aspect, a distance from reference coordinates to designated coordinates is converted into a game parameter, and provided are a variation range in the distance in which the game parameter against the distance is relatively small (first game parameter determination step) and a variation range in the distance in which the game parameter against the distance is relatively large (second game parameter determination step), thereby enabling a player to adjust controllability for an operation using a pointing device.

According to the second aspect, a player controls a pointing device such that a distance from reference coordinates to designated coordinates has a value smaller than a predetermined threshold value, thereby enabling a process based on only a direction.

According to the third aspect, a player controls a pointing device such that a distance from reference coordinates to designated coordinates has a value greater than the predetermined threshold value, thereby enabling a process based on the distance and a direction. A player controls a pointing device such that the distance has a value smaller than the predetermined threshold value, thereby enabling a process based on only a direction.

According to the fourth aspect, a distance from reference coordinates to designated coordinates is converted into a game parameter, and provided are a variation range in the distance in which an amount of change for the game parameter against an amount of change for the distance is relatively small and a variation range in the distance in which an amount of change for the game parameter against an amount of change for the distance is relatively large, thereby enabling a player to adjust controllability for an operation using a pointing device depending on the variation range in the distance.

The player is allowed to slightly adjust an operation input using the variation range in the distance in which the amount of change for the game parameter is relatively small.

According to the fifth aspect, a distance from reference coordinates to designated coordinates is converted into a game parameter, and provided are a variation range in the distance in which an amount of change for the game parameter is proportional to an amount of change for the distance, and the amount of change for the game parameter against the amount of change for the distance is relatively small, and a variation range in the distance in which an amount of change for the game parameter is proportional to an amount of change for the distance, and the amount of change for the game parameter against the amount of change for the distance is relatively large, whereby a player can easily predict a change of the game parameter for each variation range in the distance according to an operation of a pointing device. Further, a process of converting the distance into the game parameter is simplified.

According to the sixth aspect, the effect of the fifth aspect is obtained and further the game parameters calculated for the respective variation ranges in the distance have consecutive values, whereby a process can be smoothly performed depending on a distance from reference coordinates to designated coordinates during an operation using a pointing device.

According to the seventh aspect, a game parameter adjustable according to controllability with which a player controls a pointing device, can be used as a movement speed of a game object.

According to the eighth aspect, a direction in which a player controls a pointing device can be used as a direction of a game object.

According to the ninth aspect, a player can control a position of reference coordinates according to controllability, whereby the player is not required to visually confirm the position of the reference coordinates. Further, reference coordinates are not fixed in the pointing device, whereby a player can start an operation at any position in a coordinate system of a pointing device.

Further, the game apparatus and the storage medium having a program stored thereon according to the present invention can achieve the same effect as the storage medium having the aforementioned game program stored thereon.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 shows a subroutine as a detailed operation of processing a menu in step 65 shown in FIG. 10.

DESCRIPTION OF THE PREFERRED EMBODIMENTS

Figure 1:
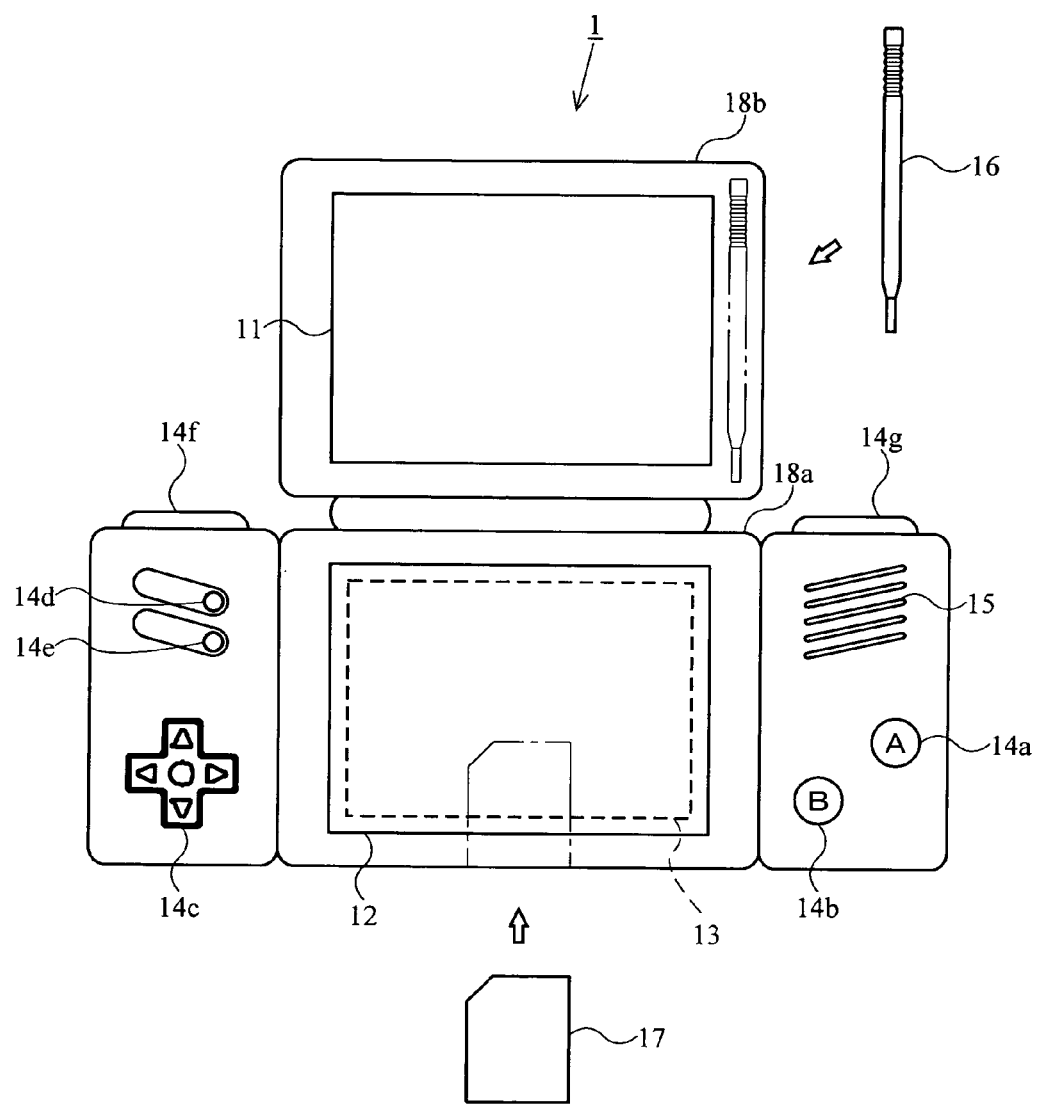
FIG. 1 is an outline view illustrating a game apparatus 1 executing a game program according to an exemplary illustrative embodiment.

A game apparatus which executes a game program according to an exemplary illustrative embodiment will be described with reference to the drawings. FIG. 1 is an outline view illustrating a game apparatus 1 which executes a game program according to the exemplary illustrative embodiment presented herein. Here, a portable game apparatus is shown as an example of the game apparatus 1.

In FIG. 1, the game apparatus 1 according to the present embodiment is accommodated in a housing 18 so that two liquid crystal display devices (hereinafter, referred to as "LCDs") 11 and 12 are placed in predetermined positions. Specifically, in a case where the first LCD 11 and the second LCD 12 are to be positioned one on top of the other, the housing 18 is composed of a lower housing 18a and an upper housing 18b, the upper housing 18b being pivotably supported by a portion of the upper side of the lower housing 18a. The upper housing 18b has a planar contour which is slightly larger than that of the first LCD 11. The upper housing 18b has an opening in one principal face thereof, through which a display screen of the first LCD 11 is exposed. The lower housing 18a has a more elongated planar contour than that of the upper housing 18b (i.e., so as to have a longer lateral dimension). An opening for exposing the display screen of the second LCD 12 is formed in a portion of the lower housing 18a which lies substantially in the center of the lower housing 18a along the lateral direction. A sound hole for the loudspeaker 15 is formed in either (right or left) wings of the lower housing 18a between which the second LCD 12 is interposed. An operation switch section 14 is provided on the right and left wings of the lower housing 18a between which the second LCD 12 is interposed.

The operation switch section 14 includes: an operation switch ("A" button) 14a and an operation switch ("B" button) 14b, which are provided on a principal face of the right wing of the lower housing 18a (lying to the right of the second LCD 12); a direction switch (cross key) 14c, a start switch 14d, and a select switch 14e, which are provided on a principal face of the left wing of the lower housing 18a (lying to the left of the second LCD 12); and side switches 14f and 14g. The operation switches 14a and 14b are used for giving instructions such as: "pass" "shoot", etc., in the case of a sports game such as a soccer game; "jump", "punch", "use a weapon", etc., in the case of an action game; or "get an item", "select a weapon", "select a command", etc., in the case of a role playing game (RPG) or a simulation RPG The direction switch 14c is used by a player for providing instructions concerning directions on the game screen, e.g., instructions of moving directions of (i.e., a direction in which to move) a player object (or a player character) that can be controlled by using the operation switch section 14, or instructions of a moving direction for a cursor, for example. The side switch ("L" button) 14f and the side switch ("R" button) 14g are provided at the left and right ends of an upper face (upper side face) of the lower housing 18a. As necessary, more operation switches may be added.

Further, a touch panel 13 (an area marked by dotted lines in FIG. 1) is mounted on the upper principal face of the second LCD 12 as an example of the input device of the present invention. The touch panel 13 may be of any one of, for example, a resistive film type, an optical type (infrared type), or a capacitive coupling type. The touch panel 13 is, for example, a pointing device which, when a stylus 16 (or a finger) is pressed against or moved or dragged on the upper principal face of the touch panel 13, detects the coordinate position of the stylus 16 and outputs coordinate data.

As necessary, a hole (an area marked by double-dot lines in FIG. 1) for accommodating the stylus 16 with which to manipulate the touch panel 13 is provided near a side face of the upper housing 18b. The hole can hold the stylus 16. In a portion of a side face of the lower housing 18a is provided a cartridge receptacle (an area marked by dash-dot lines in FIG. 1), into which a game cartridge 17 (hereinafter simply referred to as "the cartridge 17") internalizing a memory having a game program stored therein (e.g., a ROM) is detachably inserted. The cartridge 17 is an information storage medium for storing a game program, e.g., a non-volatile semiconductor memory such as a ROM or a flash memory. A connector (see FIG. 2) lies inside the cartridge receptacle for providing electrical connection with the cartridge 17. Furthermore, the lower housing 18a (or alternatively the upper housing 18b) accommodates an electronic circuit board on which various electronic components such as a CPU are mounted. Examples of the information storage medium for storing a game program are not limited to the aforementioned non-volatile semiconductor memory, but may also be a CD-ROM, a DVD, or any other optical disk type storage medium.

Figure 2:
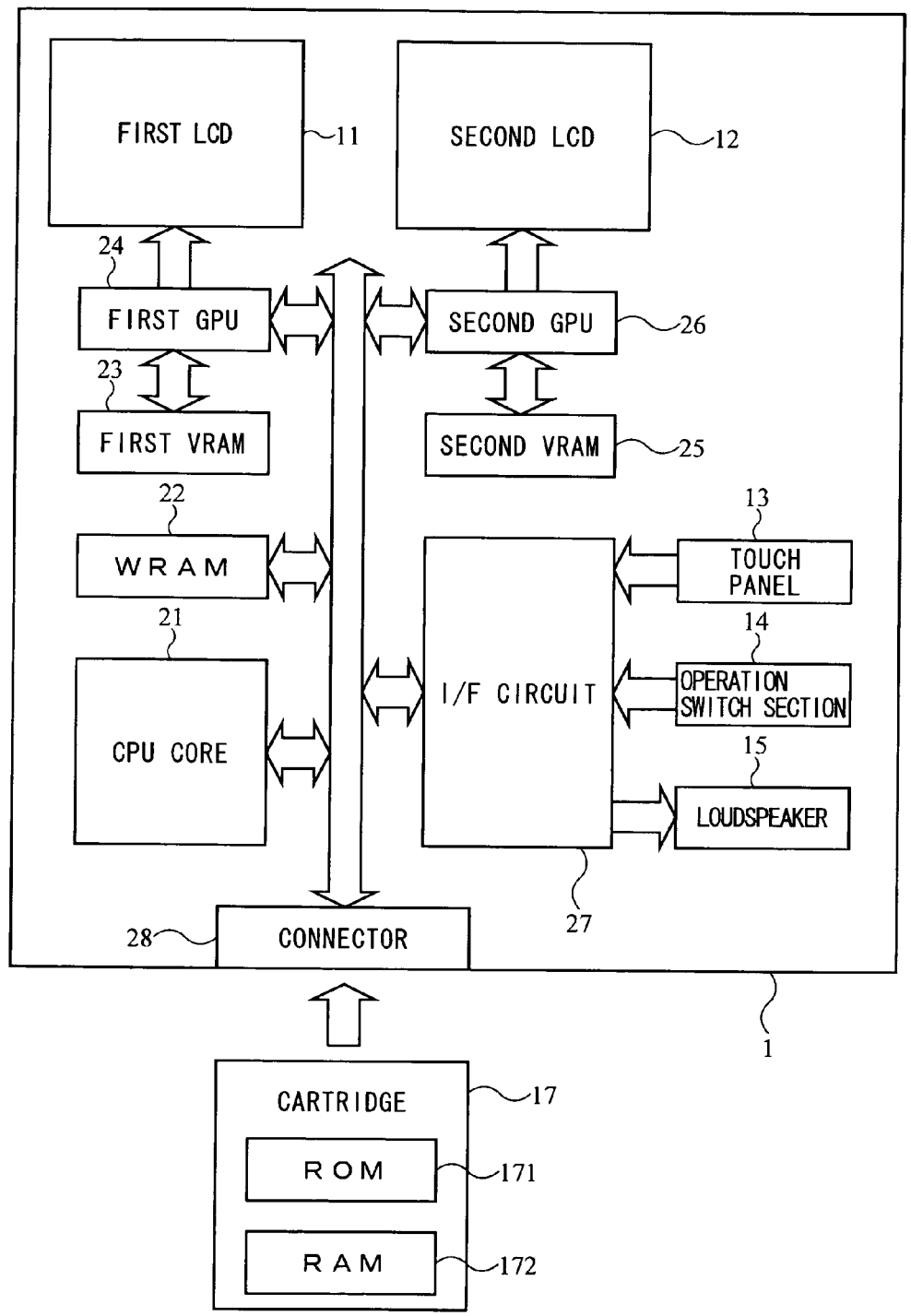
FIG. 2 is a block diagram illustrating an internal structure of the game apparatus 1 shown in FIG. 1.

Next, referring to FIG. 2, the internal structure of the game apparatus 1 will be described. FIG. 2 is a block diagram illustrating an internal structure of the game apparatus 1 of FIG. 1.

In FIG. 2, a CPU core 21 is mounted on the electronic circuit board accommodated in the housing 18. Via a predetermined bus, the CPU core 21 is connected to a connector 28 for enabling connection with the cartridge 17, an input/output interface (I/F) circuit 27, a first graphics processing unit (first GPU) 24, a second graphics processing unit (second GPU) 26, and a working RAM (WRAM) 22.

The cartridge 17 is detachably connected to the connector 28. As described above, the cartridge 17 is a storage medium for storing a game program. Specifically, the cartridge 17 includes a ROM 171 for storing a game program and a RAM 172 for storing backup data in a rewritable manner. A game program which is stored in the ROM 171 of the cartridge 17 is loaded to a WRAM 22, and the game program having been loaded to the WRAM 22 is executed by the CPU core 21. Temporary data which is obtained by the CPU core 21 executing the game program and data from which to generate images are stored in the WRAM 22.

Thus, the ROM 171 has stored thereon a game program which comprises instructions and data which are of a format executable by a computer in the game apparatus 1, in particular by the CPU core 21. The game program is loaded to the WRAM 22 as appropriate, and executed. Although the present embodiment illustrates an example where the game program and the like are stored on the cartridge 17, the game program and the like may be supplied via any other medium or via a communications circuit.

The touch panel 13, the operation switch section 14, and the loudspeaker 15 are connected to the I/F circuit 27. The loudspeaker 15 is placed inside the aforementioned sound hole.

The first GPU 24 is connected to a first video-RAM (hereinafter "VRAM") 23. The second GPU 26 is connected to a second video-RAM (hereinafter "VRAM") 25. In accordance with an instruction from the CPU core 21, the first GPU 24 generates a first game image based on the data used for generation of image which is stored in the WRAM 22, and writes image data into the first VRAM 23. In accordance with an instruction from the CPU core 21, the second GPU 26 generates a second game image based on the data used for generation of image which is stored in the WRAM 22, and writes image data into the second VRAM 25.

The first GPU 24 is connected to the first LCD 11, and the second GPU 26 is connected to the second LCD 12. The first GPU 24 outputs to the first LCD 11 the first game image which has been written into the first VRAM 23 in accordance with an instruction from the CPU core 21, and the first LCD 11 displays the first game image having been outputted from the first GPU 24. The second GPU 26 outputs to the second LCD 12 the second game image which has been written into the second VRAM 25 in accordance with an instruction from the CPU core 21, and the second LCD 12 displays the second game image having been outputted from the second GPU 26.

The I/F circuit 27 is a circuit which governs exchanges of data between the CPU core 21 and the external input/output devices such as the touch panel 13, the operation switch section 14, and the loudspeaker 15. The touch panel 13 (including a device driver for the touch panel) has a touch panel coordinate system corresponding to the coordinate system of the second VRAM 25, and outputs data of position coordinates corresponding to a position which is inputted (designated) by means of the stylus 16 or the like. For example, the display screen of the second LCD 12 has a resolution of 256 dots×192 dots, and the touch panel 13 also has a detection accuracy of 256 dots×192 dots so as to correspond to the display screen. The detection accuracy of the touch panel 13 may be lower or higher than the resolution of the display screen of the second LCD 12.

Figure 3:
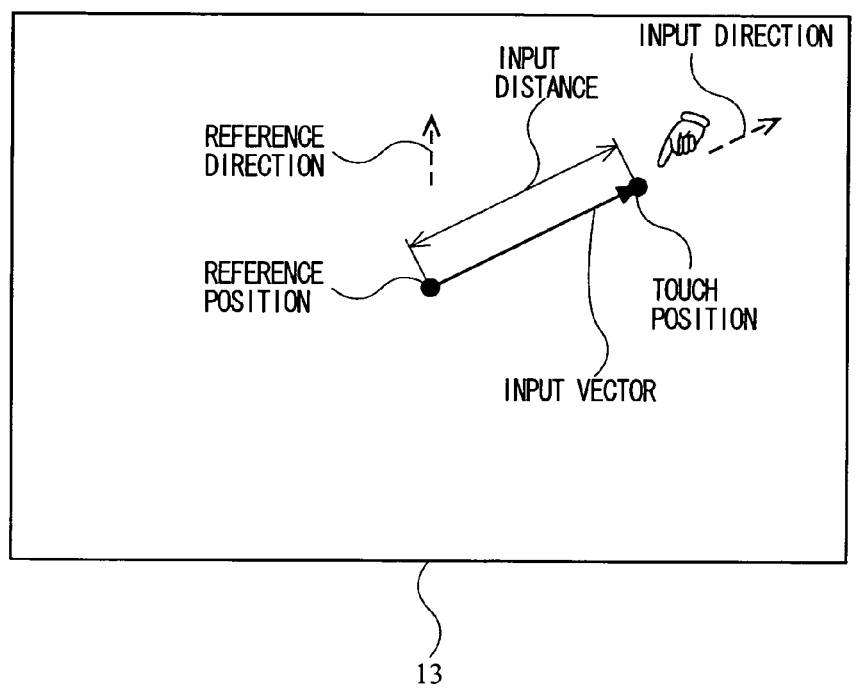
FIG. 3 is a diagram for showing an input vector set when the touch panel 13 of FIG. 1 is touch-operated.
Figure 4:
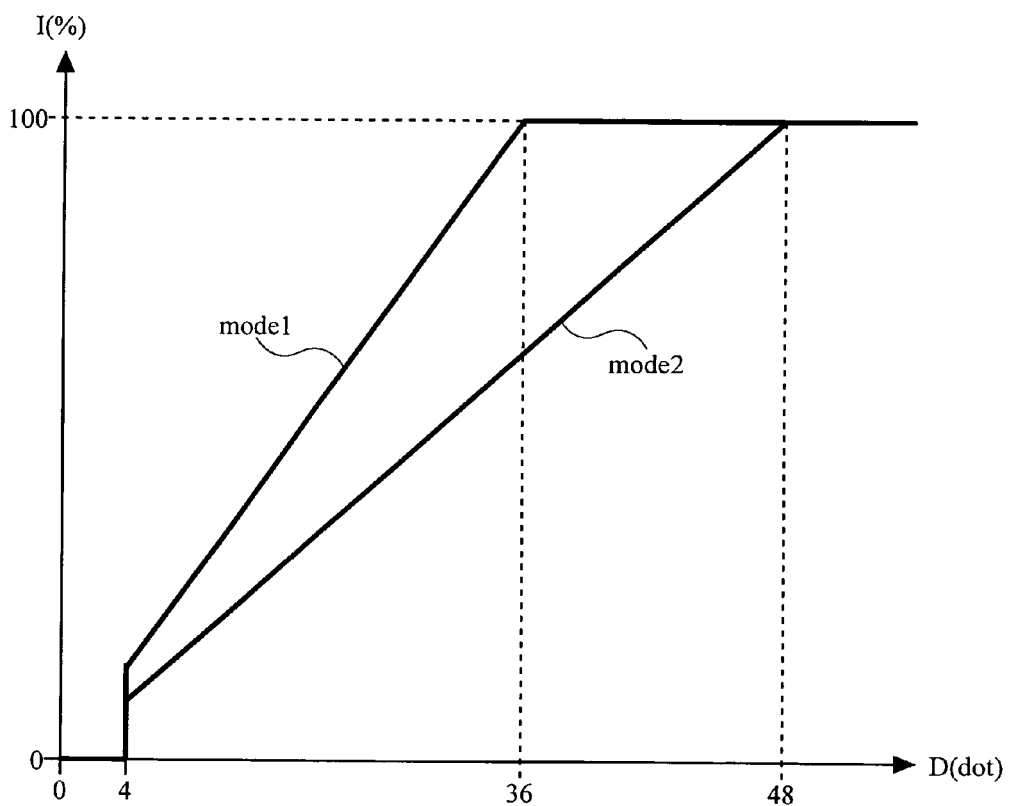
FIG. 4 is a graph for explaining an input level I against an input distance D.
Figure 5:
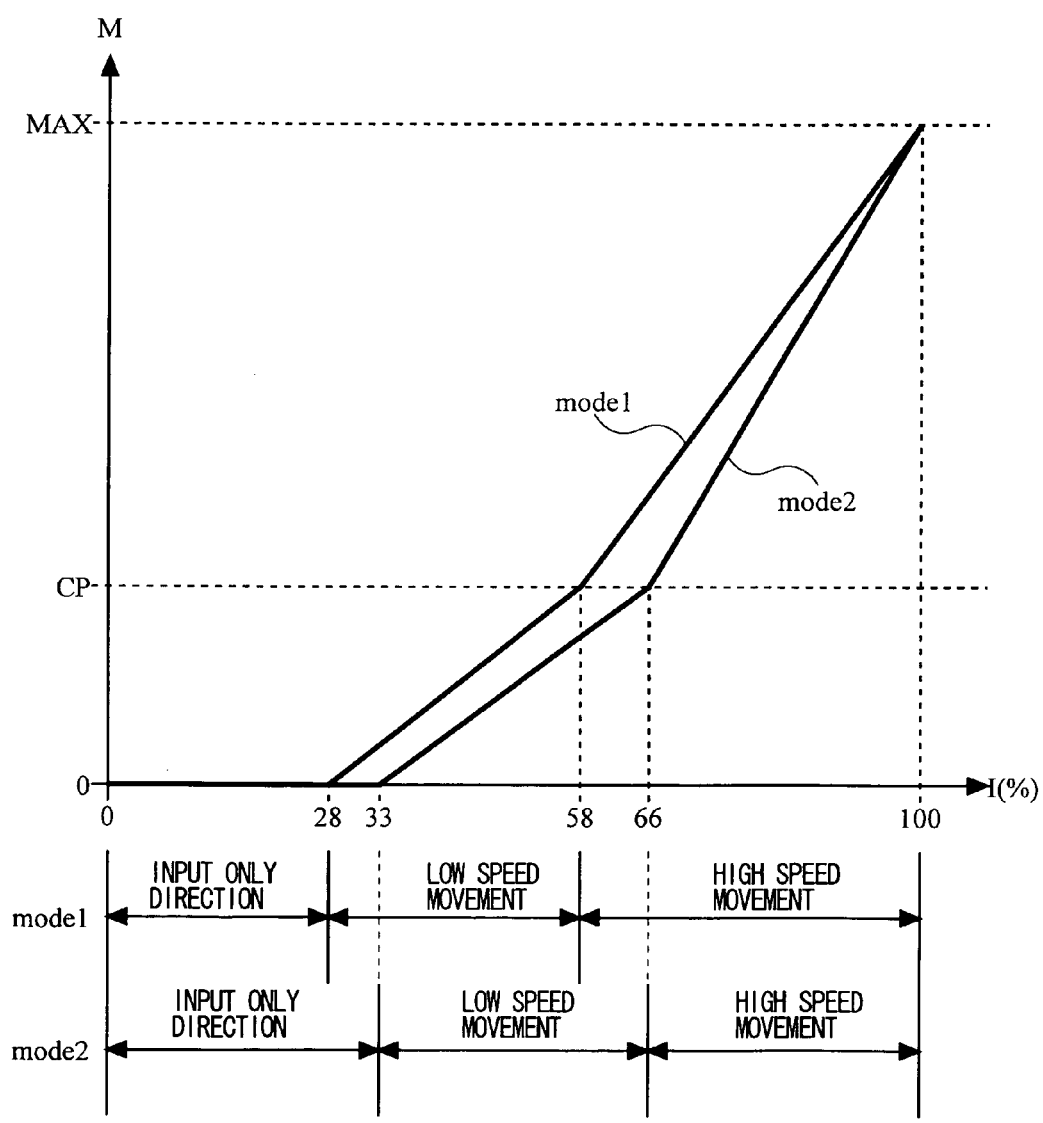
FIG. 5 is a graph for explaining a movement distance M against the input level I in a normal operation.
Figure 6:
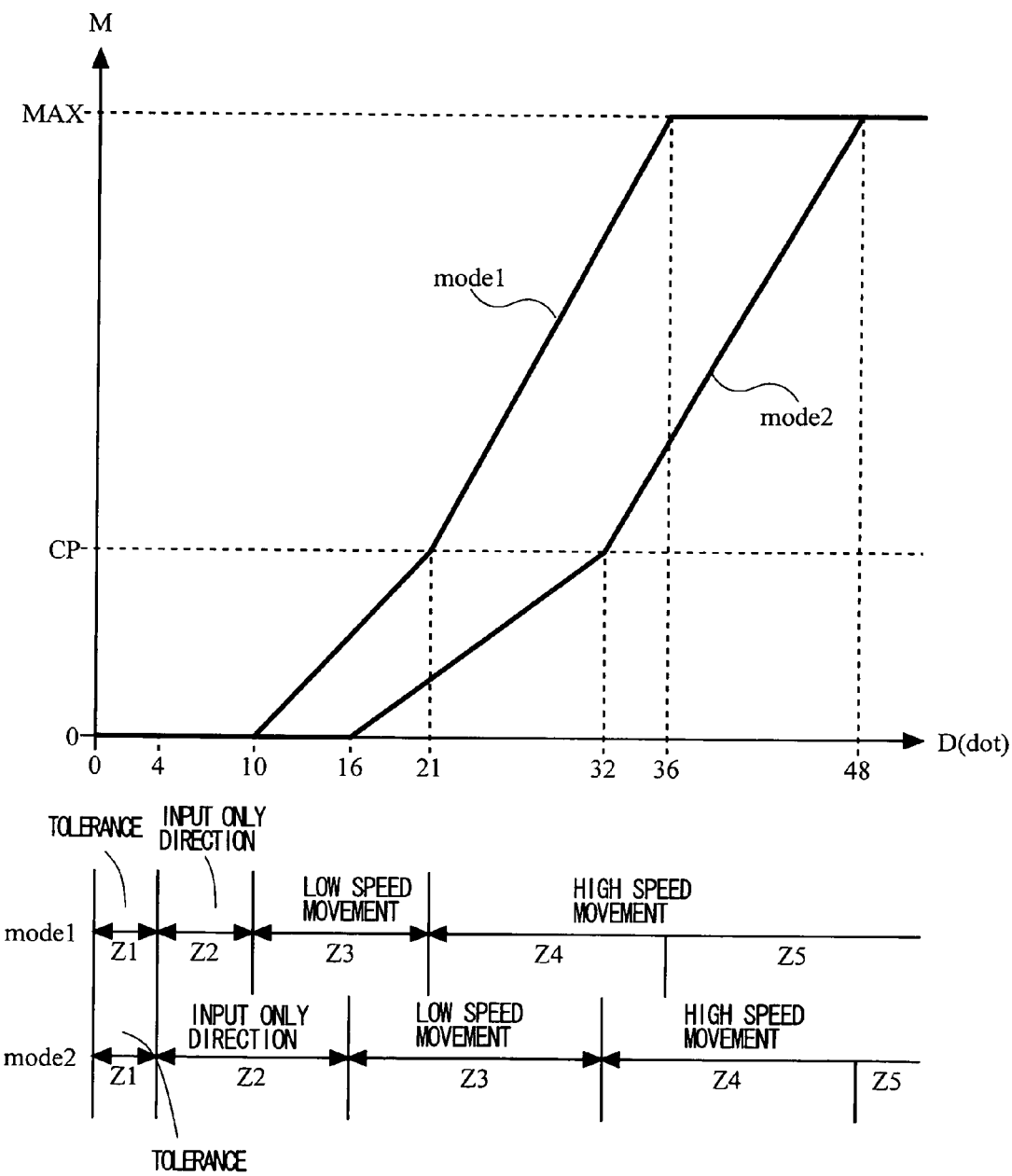
FIG. 6 is a graph for explaining a movement distance M against an input distance D based on a relationship between the graph of FIG. 4 and the graph of FIG. 5.
Figure 7:
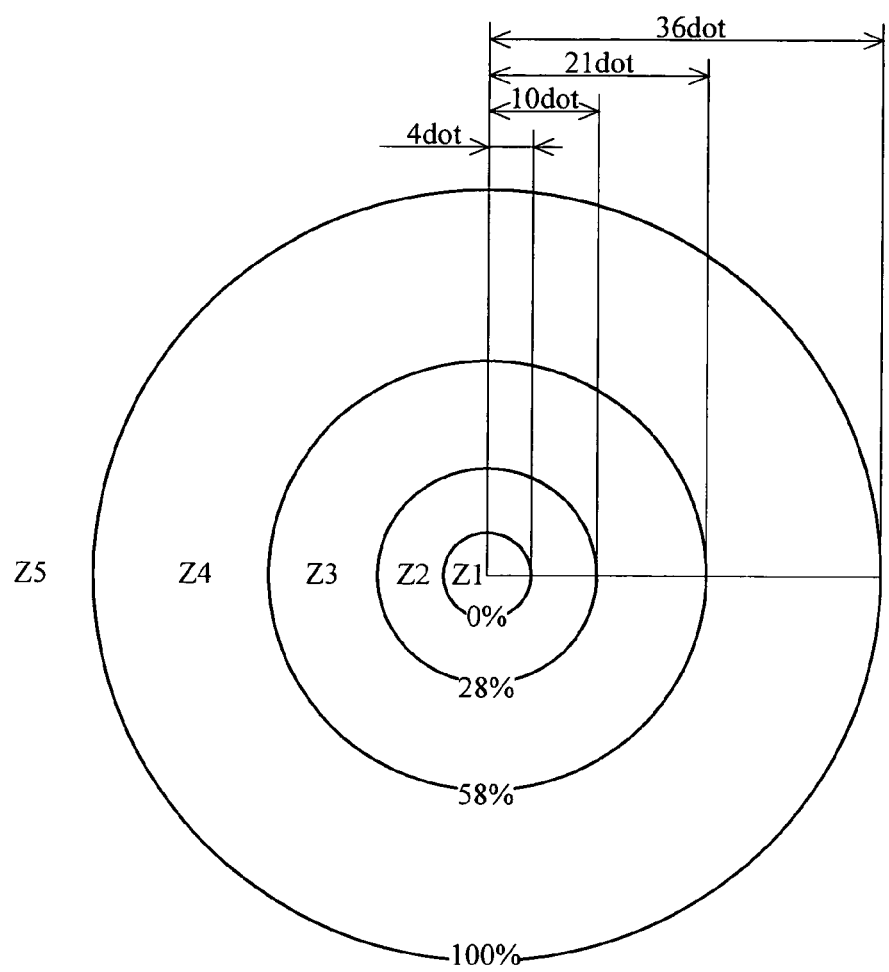
FIG. 7 is a diagram for explaining the respective operation instruction areas Z1 to Z5 which are set on the touch panel 13 in the case of a first mode "mode1"
Figure 8:
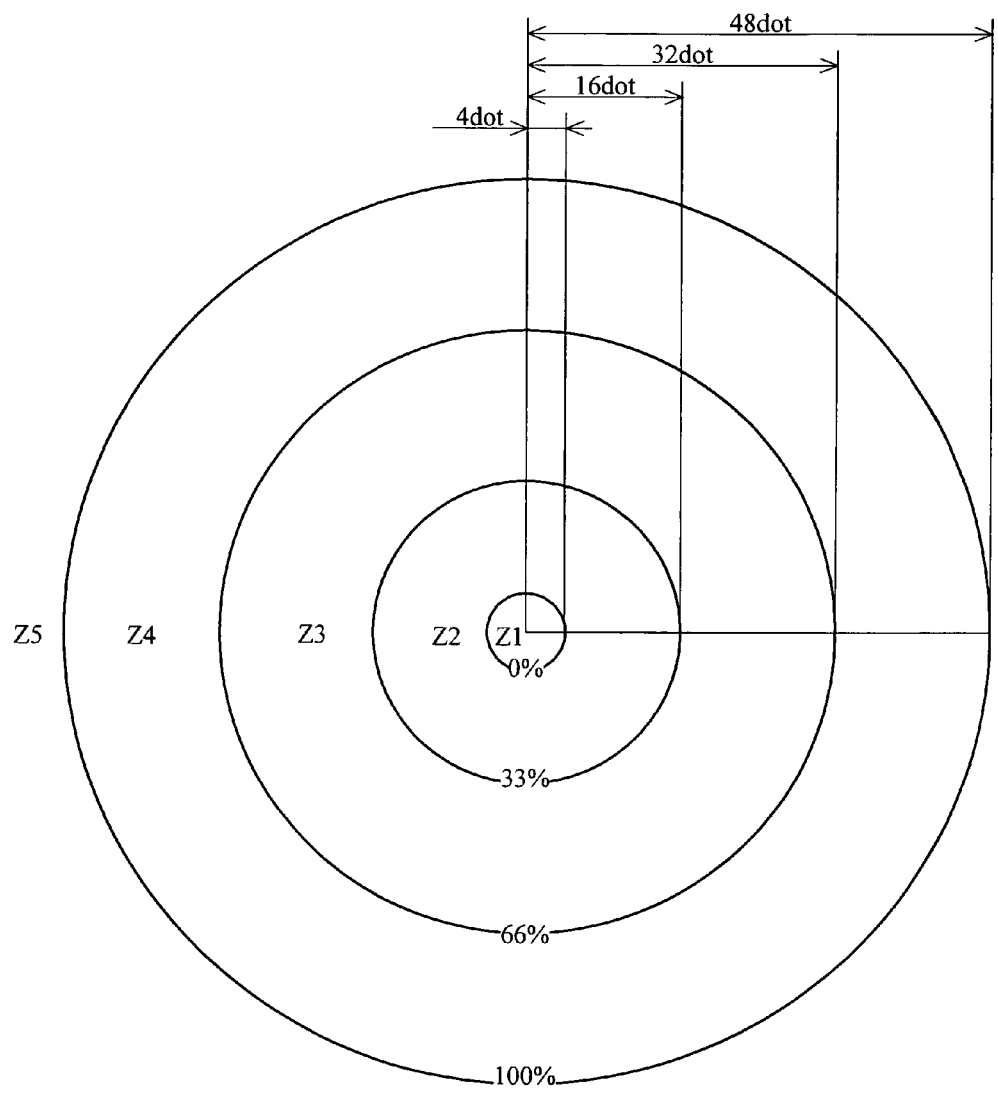
FIG. 8 is a diagram for explaining the respective operation instruction areas Z1 to Z5 which are set on the touch panel 13 in the case of a second mode "mode2"
Figure 9:
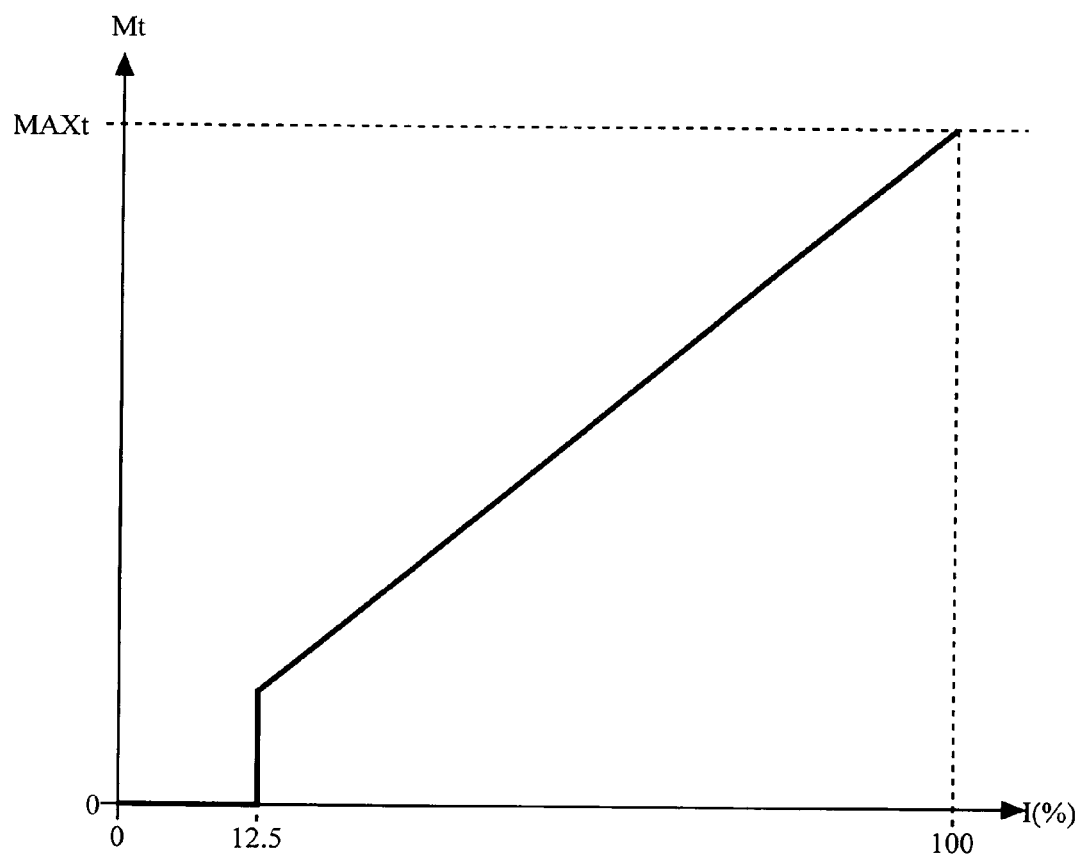
FIG. 9 is a graph for explaining a movement distance M against an input level I in a special operation.

Hereinafter, examples of processes which are performed by using a game program executed by the game apparatus 1 will be described in detail with reference to FIGS. 3 to 9. FIG. 3 is a diagram for showing an input vector which is set when the touch panel 13 is touch-operated. FIG. 4 shows a graph for explaining an input level I against an input distance D. FIG. 5 shows a graph for explaining a movement distance M against the input level I in a normal operation. FIG. 6 shows a graph for explaining a movement distance M against the input distance D based on a relationship between the graph of FIG. 4 and the graph of FIG. 5. FIG. 7 is a diagram for explaining the respective operation instruction areas Z1 to Z5 provided on the touch panel 13 in a first mode "mode1". FIG. 8 is a diagram for explaining the respective operation instruction areas Z1 to Z5 provided on the touch panel 13 in a second mode "mode2". FIG. 9 shows a graph for explaining a movement distance M against the input level I in a special operation.

In FIG. 3, a reference position which is a reference for touch-operation is firstly set on the touch panel 13. For example, the reference position may be fixed at a predetermined position on the touch panel 13 (for example, at the center of the touch panel 13) or may be set at a position designated by a player. When the reference position is set at a position designated by a player, for example, the reference position may be set as a position at which the player touches on the touch panel 13 (which corresponds to an operation of the touch panel 13 being firstly touched). The reference position may be moved according to the subsequent touch-operation. For example, when a distance between the reference position and a touch position described later is greater than a predetermined value, the reference position may be changed such that the distance has the predetermined value.

A vector connecting from the reference position to a position at which a player is touch-operating the touch panel 13 (touch position) is set as an input vector. That is, when the player changes the touch position, a direction of the input vector (input direction) and a length of the input vector (input distance) are changed. In an operation performed by the game apparatus 1 described later, the input direction is represented as an angle between the direction of the input vector and the reference direction (for example, a forward direction along the touch panel 13) and the input distance is represented as the number of dots on the touch panel 13.

As shown in FIG. 4, the game apparatus 1 calculates an input level I (%) according to an input distance D (dot) inputted from the touch panel 13. Here, the game apparatus 1 changes a conversion equation for converting the input distance D into the input level I according to a mode selected when a game is started. For example, the mode is set according to a method in which a player touch-operates the touch panel 13. Specifically, a first mode "mode1" is set as a mode in which a player touch-operates the touch panel 13 with his or her finger or with a predetermined pointing member fitted on the finger. Further, a second mode "mode2" is set as a mode in which a player touch-operates the touch panel 13 using the stylus 16. Hereinafter, although a description will be given of an example where two modes (a first mode "mode1" and a second mode "mode2) are set for the aforementioned purpose, the modes may be set according to another condition. For example, two or more modes may be set according to difficulty of a game. Further, multiple modes may be set according to an age of a player touch-operating the touch panel 13.

When the first mode "mode1" is set, the game apparatus 1 converts the input distance D (dot) into the input level I (%) using the conversion equation represented as:

| | |
|---|---|
| I = 0 | (D ≦ 4 dots) |
| I = (100/36)*D | (4 dots < D ≦ 36 dots) |
| I = 100 | (36 dots < D) |

On the other hand, when the second mode "mode2" is set, the game apparatus 1 converts the input distance D (dot) into the input level I (%) using the conversion equation represented as:

| | |
|---|---|
| I = 0 | (D ≦ 4 dots) |
| I = (100/48)*D | (4 dots < D ≦ 48 dots) |
| I = 100 | (48 dots < D) |

Thus, the game apparatus 1 converts the input distance D≦4 dots into the input level I=0 in both modes, and a tolerance area for the touch-operation (an area in which no game process is performed even when an operation is inputted) is provided. Further, the game apparatus 1 sets an input distance D corresponding to a maximum input level (I=100%) in the respective modes. An input distance greater than or equal to the input distance D is converted into the maximum input level. In other words, the game apparatus 1 converts, into the maximum input level, the input distance D greater than or equal to 36 dots in the first mode "mode1", while the game apparatus 1 coverts, into the maximum input level, the input distance D greater than or equal to 48 dots in the second mode "mode2". In a section in which the maximum input level is not obtained, the game apparatus 1 multiplies the input distance D by a coefficient representing a different gradient depending on the mode, and converts the multiplied input distance D into the input level I.

As shown in FIG. 5, the game apparatus 1 calculates a movement distance M according to an input level I (%) having been obtained. For example, the movement distance M shown in FIG. 5 is one of a plurality of game parameters, indicating a movement distance per unit time used in a normal operation in which a player character appearing in a game space moves on a field provided in the game space. Here, the game apparatus 1 changes the conversion equation for converting the input level I into the movement distance M according to the aforementioned mode.

When the first mode "mode1" is set, the game apparatus 1 converts the input level I (%) into the movement distance M using the conversion equation represented as:

| | |
|---|---|
| M = 0 | (I ≦ 28%) |
| M = (CP/30)*I − (14/15)*CP | (28% < I ≦ 58%) |
| M = {(MAX − CP)/42}*I + (50*CP − 29*MAX)/21 | (58% < I ≦ 100%) |

Here, MAX represents a maximum movement distance per unit time over which the player character is allowed to move on the field (maximum movement distance MAX). Further, CP represents a change-over movement distance. The change-over movement distance CP represents a boundary at which the player character on the field changes from a low speed movement to a high speed movement. On the other hand, when the second mode "mode2" is set, the game apparatus 1 converts the input level I (%) into the movement distance M using the conversion equation represented as:

| | |
|---|---|
| M = 0 | (I ≦ 33%) |
| M = (CP/33)*I − CP | (33% < I ≦ 66%) |
| M = {(MAX − CP)/34}*I + (50*CP − 33*MAX)/17 | (66% < I ≦ 100%) |

Thus, the game apparatus 1 converts the input level I≦28% into the movement distance M=0 in the first mode "mode1" and converts the input level I≦33% into the movement distance M=0 in the second mode "mode2", thereby setting a section in which the player character does not move even when the touch-operation is performed. As is apparent from the following description, when the movement distance M=0 and the input distance D>4 dots, an input direction is set and the player is allowed to input only a direction using the touch panel 13. Therefore, for example, in a case where a movement distance of the player object appearing in a virtual three-dimensional space can be determined based on the input distance, and a direction of the player object is changed based on the input direction, when the input level I≦28% (first mode) and when the input level I≦33% (second mode), the player object can be turned, involving no movement distance, at the same position where the player object has been present, and when the input level I>28% (first mode) and when the input level I>33% (second mode), the moving player object can be turned involving a movement distance. The player can continuously perform the aforementioned two operations in the same input method. Moreover, the game apparatus 1 converts the maximum input level (I=100%) into the maximum movement distance MAX in both modes. A change-over movement distance CP is set in a section in which the maximum movement distance MAX is not obtained, and the input level I is multiplied by a coefficient of a different gradient depending on the mode, and the multiplied input level I is converted into a movement distance M. The gradient used between the movement distance M=0 and the change-over movement distance CP (that is, a low speed movement section) is set smaller than a gradient used between the change-over movement distance CP and the maximum movement distance MAX (a high speed movement section). That is, an amount of change for the movement distance M against an amount of change for the input level I is smaller in the low speed movement section than in the high speed movement section. Therefore, the player is allowed to slightly change the movement distance M on the touch panel 13. Therefore, for example, even when an input distance D corresponding to the maximum input level (I=100%) has a relatively small value, the player can effectively control the touch panel 13 according to whether the player desires to slightly move the player object or the player desires to rapidly move the player object.

Although in the above description, the game apparatus 1 uses a linear function as a conversion equation for converting the input level I into the movement distance M, the conversion equation may be a quadric or higher order function having a variable gradient. A conversion equation for converting an input level I into a value greater than a movement distance M into which the input level I is converted using a conversion equation for the low speed movement section, is used for the high speed movement section, thereby achieving the same effect. For example, while an order of the conversion equation used for the low speed movement section is the same as an order of the conversion equation used for the high speed movement section, a coefficient of the highest order in the conversion equation for the high speed movement section may be greater than a coefficient of the highest order in the conversion equation for the low speed movement section. Furthermore, an order of the conversion equation for the high speed movement section may be greater than an order of the conversion equation for the low speed movement section. Furthermore, the respective conversion equations used in the low speed movement section and the high speed movement section do not necessarily have to provide consecutive values, and non-consecutive conversion functions may be used in the respective sections. Moreover, in the above description, when the low speed movement section changes to the high speed movement section (that is, at the change-over movement distance CP), the respective conversion equations are determined so as not to abruptly change between the movement distances M. However, the respective conversion equations may be determined so as to abruptly increase the movement distance M when the low speed movement section changes to the high speed movement section.

An input level I is calculated according to the input distance D as described above, and the movement distance M is calculated based on the input level I. Thereby, the respective operation instruction areas Z1 to Z5 are provided for each mode as the respective concentric areas toward outer circumference of a circle having a reference position at the center thereof, from the center. As shown in FIGS. 6 and 7, for the first mode "mode1", a tolerance area (operation instruction area Z1: 0≦D≦4 dots), an area in which only a direction can be indicated (operation instruction area Z2: 4 dots<D≦10 dots), a low speed movement area (operation instruction area Z3: 10 dots<D≦21 dots), a high speed movement area (operation instruction area Z4: 21 dots<D≦36 dots), and a maximum speed movement area (operation instruction area Z5: 36 dots<D) are provided in this order from the reference position toward the outer circumference. The areas provided for the first mode "mode1" correspond to the input levels I having the following values, respectively. The input level I is 0% in the operation instruction area Z1, the input level I is 0%<I≦28% in the operation instruction area Z2, the input level I is 28%<I≦58% in the operation instruction area Z3, the input level I is 58%<I≦100% in the operation instruction area Z4, and the input level I is 100% in the operation instruction area Z5.

On the other hand, as shown in FIGS. 6 and 8, for the second mode "mode2", a tolerance area (operation instruction area Z1: 0≦D≦4 dots), an area in which only a direction can be indicated (operation instruction area Z2: 4 dots<D≦16 dots), a low speed movement area (operation instruction area Z3: 16 dots<D≦32 dots), a high speed movement area (operation instruction area Z4: 32 dots<D≦48 dots), and a maximum speed movement area (operation instruction area Z5: 48 dots<D) are provided in this order from the reference position toward the outer circumference. The areas provided in the second mode "mode2" correspond to the input levels I having the following values, respectively. The input level I is 0% in the operation instruction area Z1, the input level I is 0%<I≦33% in the operation instruction area Z2, the input level I is 33%<I≦66% in the operation instruction area Z3, the input level I is 66%<I≦100% in the operation instruction area Z4, and the input level I is 100% in the operation instruction area Z5.

As is apparent from FIGS. 4 to 8, a minimum value of the input distance D corresponding to the maximum input level (I=100%) is set greater in the second mode "mode2" than in the first mode "mode1". Further, a distance from the reference position to an outer circumference of the area in which only a direction can be indicated (operation instruction area Z2) is set so as to have a greater value in the second mode "mode2" than in the first mode "mode1". Furthermore, a distance from the reference position to a boundary at which conversion equations are changed (a boundary between operation instruction areas Z3 and Z4) is set so as to have a greater value in the second mode "mode2" than in the first mode "mode1". In other words, for the second mode "mode2", the operation instruction areas Z2 to Z4 are set wider, and an amount of change for the movement distance M against an amount of change for the input distance D (dot) is set smaller (that is, the gradient is smaller) on the touch panel 13 in the operation instruction areas Z3 and Z4. As described above, the first mode "mode1" is set as a mode in which a player touch-operates the touch panel 13 with his or her finger or the pointing member fitted on the finger, while the second mode "mode2" is set as a mode in which a player touch-operates the touch panel 13 with the stylus 16. In general, when a player touch-operates the touch panel 13 with a stick type instrument such as the stylus 16, the stick type instrument tends to make its input distance longer than the player directly touch-operates the touch panel 13 with his or her finger. This is because a distance between a position at which the player holds the stylus 16 and a position at which the stylus 16 touches the touch panel 13 (that is, a tip of the stylus 16) is long, and therefore the stylus 16 has a longer distance between a fulcrum and a point of action for controlling the touch panel as compared to a case where the player directly touch-operates the touch panel 13 with his or her finger. Therefore, when the player touch-operates the touch panel 13 with the stylus 16, it is difficult to make an input having a short distance. Therefore, the respective areas are set winder in a mode in which the stylus 16 is used. That is, the game apparatus 1 switches between the first mode "mode1" and the second mode "mode2" described above, thereby obtaining an appropriate game parameter according to a method for controlling the touch panel. In the present embodiment, two modes, that is, a mode used for a finger and a mode used for a stylus are provided. However, the modes may be determined according to, for example, whether the player is an adult or a child or whether the player is male or female, in consideration of a size of the player's finger. Further, players having the same size of fingers may have different dexterities of fingers. Eventually, the player may select his or her desired one of two modes. An input level corresponding to an outer circumference of the area (Z2) in which only a direction can be indicated is set greater in the second mode "mode2" than in the first mode "mode1". Furthermore, an input level corresponding to a boundary at which the conversion equations are changed (the boundary between the operation instruction areas Z3 and Z4) is set greater in the second mode "mode2" than in the first mode "mode1".

As another example, the game apparatus 1 calculates a movement distance Mt according to an input level I (%) as shown in FIG. 9. For example, the movement distance Mt shown in FIG. 9 is one of a plurality of game parameters, indicating a movement distance per unit time in a specific operation (specific condition) different from a normal operation in which a player character appearing in a game space moves on a field provided in the game space. For example, the aforementioned specific operation includes an operation of a player character climbing a tree in a game space. In this case, the game apparatus 1 uses the same conversion equation for converting the input level I into the movement distance Mt for both modes described above.

In the specific operation, the game apparatus 1 converts the input level I (%) into the movement distance Mt in both the first mode "mode1" and the second mode "mode2" using the conversion equation represented as:

| | |
|---|---|
| M = 0 | (I ≦ 12.5%) |
| M = (MAXt/100)*I | (12.5% < I ≦ 100%) |

Here, MAXt represents a maximum movement distance MAXt per unit time over which the player character is allowed to move in the specific operation.

Although above-described is an example where the game apparatus 1 converts the input level I into the movement distance Mt in the specific operation, the input level I may be used so as to obtain another game parameter. For example, in a case where the specific operation is an operation of a player character diving into the water in a game space, an angle at which the player character dives into the water is set as a game parameter and the angle may be changed according to the input level I.

Figure 10:
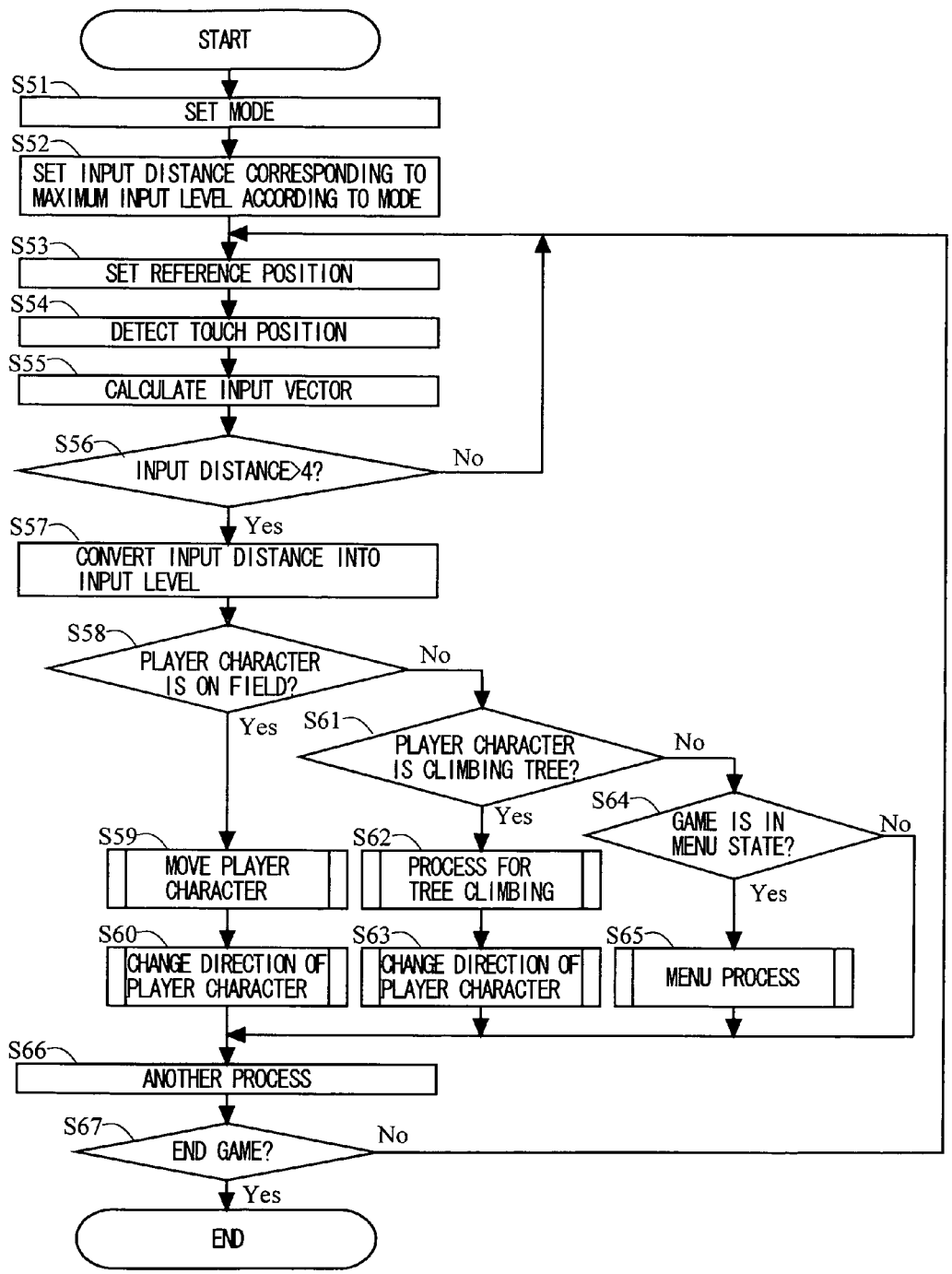
FIG. 10 is a flow chart illustrating a game process performed by the game apparatus 1 by executing the game program according to an exemplary illustrative embodiment.
Figure 11:
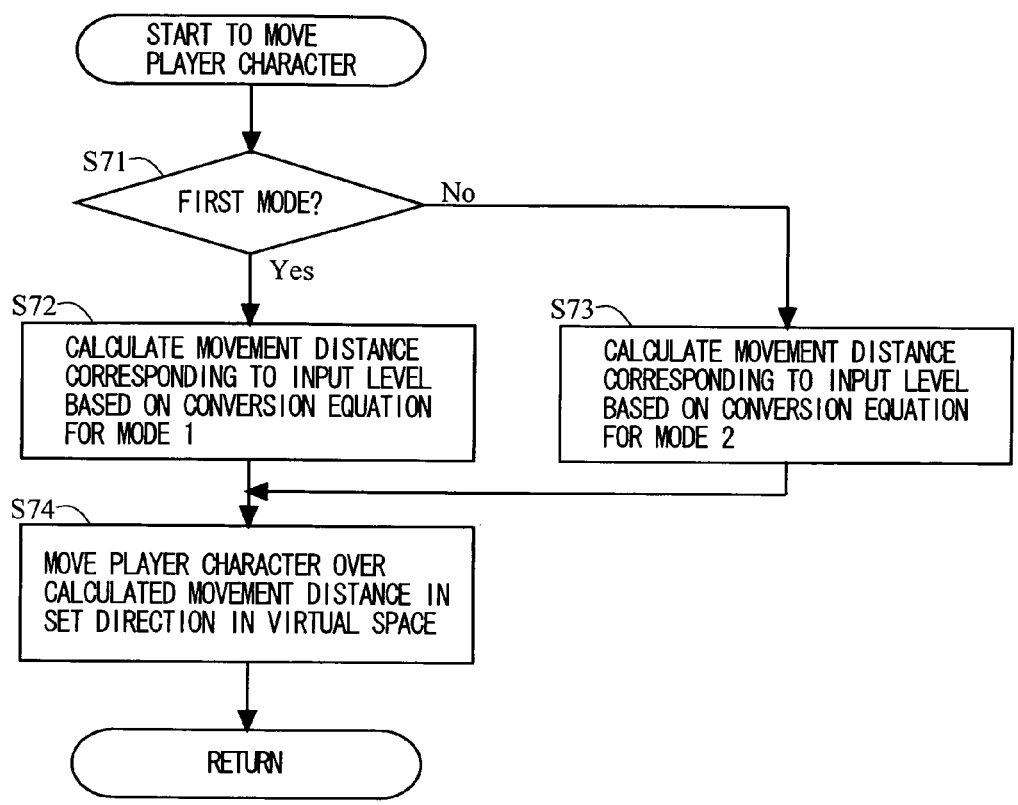
FIG. 11 shows a subroutine as a detailed operation of moving a player character in step 59 shown in FIG. 10.
Figure 12:
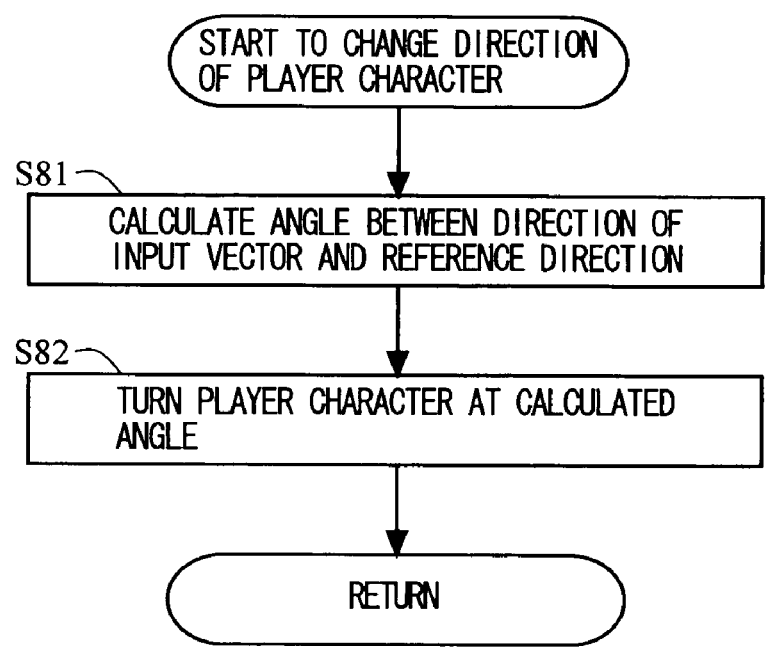
FIG. 12 shows a subroutine as a detailed operation of changing a direction of a player character in steps 60 and 63 shown in FIG. 10.
Figure 13:
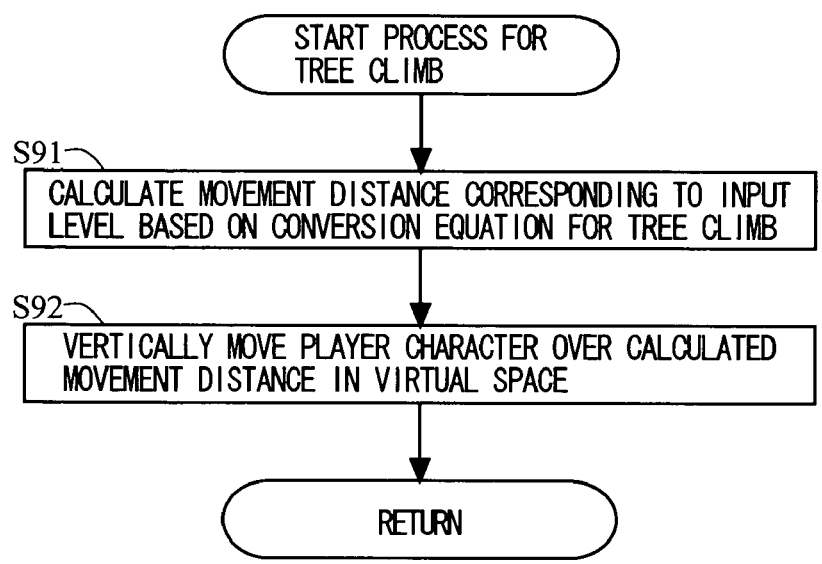
FIG. 13 shows a subroutine as a detailed operation of a tree climb in step 62 shown in FIG. 10.

Next, a game process which is based on information inputted from the touch panel 13 and which is executed by the game apparatus 1 according to the game program of the exemplary illustrative embodiment presented herein will be described with reference to FIGS. 10 to 14. FIG. 10 is a flow chart illustrating an operation of the game apparatus 1 processing a game by executing the game program. FIG. 11 shows a subroutine as a detailed operation of a movement operation in step 59 shown in FIG. 10. FIG. 12 shows a subroutine as a detailed operation of direction change in steps 60 and 63 shown in FIG. 10. FIG. 13 shows a subroutine as a detailed operation of a tree climb in step 62 shown in FIG. 10. FIG. 14 shows a subroutine as a detailed operation of processing a menu in step 65 shown in FIG. 10. Programs for executing these processes are contained in a game program stored in the ROM 171. When a power source of the game apparatus 1 is turned on, the program is loaded from the ROM 171 to the WRAM 22, and executed by the CPU core 21.

Firstly, when the power source (not shown) of the game apparatus 1 is turned on, the CPU core 21 executes a boot program (not shown), whereby the game program stored in the cartridge 17 is loaded to the WRAM 22. The game program having been loaded is executed by the CPU core 21, thereby executing steps (abbreviated as "S" in FIGS. 10 to 14) shown in FIG. 10. The game program is executed, whereby game images and the like in accordance with the game program are written into the first LCD 11 and the second LCD 12. The detailed description is not given of the contents of the game. Here, the game process based on information inputted from the touch panel 13 will be described in detail.

In FIG. 10, the CPU core 21 sets a mode in step 51, and advances the process to the next step. The mode is set according to, for example, a method for touch-operating the touch panel 13 as described above. Specifically, a player operates the operation switch section 14 of the game apparatus 1 so as to select a desired mode (that is, the first mode "mode1" or the second mode "mode2"), whereby the CPU core 21 sets a mode.

Next, in step 52, the CPU core 21 sets an input distance corresponding to a maximum input level according to the mode having been set in step 51, and advances the process to the next step. For example, as an example shown in FIG. 4, in a case where the first mode "mode1" is set, the CPU core 21 sets the input distance D=36 dots as the maximum input level I=100%. On the other hand, in a case where the second mode "mode2" is set, the CPU core 21 sets the input distance D=48 dots as the maximum input level I=100%.

Next, the CPU core 21 sets a reference position on the touch panel 13 (see FIG. 3), stores the reference position in a storage area of the WRAM 22 in step 53, detects a touch position at which the player touch-operates the touch panel 13 in step 54, and advances the process to the next step. For example, the CPU core 21 may fixedly set the reference position as the center of the touch panel 13, or may set the reference position as a position at which the player touches on the touch panel 13. For easier description, the description will be given of a case where the reference position is fixedly set at the center of the touch panel 13.

Next, the CPU core 21 calculates, as an input vector, a vector connecting from the reference position having been set in step 53 to the touch position having been detected in step 54 (see FIG. 3) in step 55, and determines whether or not an input distance of the input vector has a value greater than 4 dots in step 56. In a case where the input distance has a value smaller than or equal to 4 dots, the CPU core 21 returns the process to step 53 and repeats the process. On the other hand, in a case where the input distance has a value greater than 4 dots, the CPU core 21 advances the process to the next step 57.

In step 57, the CPU core 21 converts the input distance into an input level according to the mode having been set, and advances the process to the next step. For example, the CPU core 21 calculates an input level I based on the input distance D using a conversion equation according to the mode as described with reference to FIG. 4.

Next, the CPU core 21 determines whether or not a player character is positioned in a field in a game space (normal operation) in step 58, whether or not the player character is climbing a tree in the game space (specific operation) in step 61, and whether or not the game is in a menu state in step 64. In a case where the player character is positioned in the field (Yes in step 58), the CPU core 21 advances the process to the next step 59. On the other hand, in a case where the player character is climbing a tree (Yes in step 61), the CPU core 21 advances the process to the next step 62. Further, in a case where the game is in a menu state (Yes in step 64), the CPU core 21 advances the process to the next step 65. On the other hand, in a case where the player character is not positioned in the field and is not climbing the tree, and the game is not in the menu state (No in steps 58, 61, and 64), the CPU core 21 advances the process to the next step 66.

In step 59, the CPU core 21 moves the player character on the field. The CPU core 21 changes a direction of the player character in step 60, and advances the process to the next step 66. Hereinafter, detailed operations of moving the player character in step 59 and changing a direction of the player character in step 60 will be described with reference to FIGS. 11 and 12, respectively.

In FIG. 11, the CPU core 21 determines whether or not the mode having been set in step 51 is a first mode "mode1" in step 71. In a case where the mode is set to the first mode "mode1", the CPU core 21 advances the process to the next step 72. On the other hand, in a case where the mode is set to the second mode "mode2", the CPU core 21 advances the process to the next step 73.

In step 72, the CPU core 21 calculates a movement distance based on the input level obtained in step 57 using a conversion equation for calculating a movement distance based on an input level for the first mode "mode1", and advances the process to the next step 74. For example, the CPU core 21 converts the input level I (%) into the movement amount M using the conversion equation for the first mode "mode1" as described with reference to FIG. 5.

On the other hand, in step 73, the CPU core 21 calculates a movement distance based on the input level obtained in step 57 using a conversion equation for calculating a movement distance based on an input level for the second mode "mode2", and advances the process to the next step 74. For example, the CPU core 21 converts the input level I (%) into the movement distance M using the conversion equation for the second mode "mode2" as described with reference to FIG. 5.

In step 74, the CPU core 21 moves the player character in the game space over the calculated movement distance in a direction of the input vector having been set (input direction: see FIG. 3), and ends the process according to the subroutine.

In FIG. 12, the CPU core 21 calculates an angle between the direction of the input vector and a reference direction on the touch panel 13 (see FIG. 3) in step 81. In step 82, the CPU core 21 turns the player character in the game space at the angle calculated in step 81, and ends the process according to the subroutine.

Here, in a case where used is a conversion equation for converting an input level into a movement distance 0 in step 72 or step 73 (for example, the section of I≦28% for the first mode "mode1" or the section of I≦33% for the second mode "mode2" as shown in FIG. 5), the CPU core 21 obtains the movement distance 0. On the other hand, the game is processed according to an input direction in steps 81 and 82 even when the movement distance has a value of 0, and therefore the CPU core 21 eventually performs game process based on only the input direction obtained through the touch operation. That is, the player is allowed to indicate only one game parameter (direction) through the touch-operation using the operation instruction area Z2 formed on the touch panel 13 (see FIGS. 7 and 8). Further, in a case where a conversion equation having a smaller gradient is used in step 72 or step 73 (for example, the section of 28%<I≦58% for the first mode "mode1" or the section of 33%<I≦66% for the second mode "mode2" as shown in FIG. 5), the CPU core 21 calculates a movement distance having a relatively small amount of change against an amount of change for input level. Therefore, the player is allowed to slightly adjust the movement distance using the operation instruction area Z3 formed on the touch panel 13 (see FIGS. 7 and 8).

Returning to FIG. 10, in a case where the player character is climbing the tree (Yes in step 61), the CPU core 21 performs a process for the player character's tree climbing in step 62. The CPU core 21 changes a direction of the player character in step 63, and advances the process to the next step 66. The process for changing a direction of the player character in step 63 is the same as step 60 described with reference to FIG. 12, whereby the detailed description is not given. Hereinafter, a detailed operation of the tree climb in step 62 will be described with reference to FIG. 13.

In FIG. 13, the CPU core 21 calculates a movement distance based on the input level obtained in step 57 using a conversion equation for converting an input level into a movement distance for the process of tree climb in step 91. For example, the CPU core 21 converts an input level I (%) into a movement distance Mt using the conversion equation used for the specific operation as described with reference to FIG. 9. The CPU core 21 vertically moves the player character in the game space over the movement distance calculated in step 91, and ends the process according to the subroutine.

Returning to FIG. 10, in a case where the game is in a menu state (Yes in step 64), the CPU core 21 performs a menu process in step 65, and advances the process to the next step 66. Hereinafter, a detailed operation for the menu process in step 65 will be described with reference to FIG. 14. Here, in the menu process, the player selects an option (menu) displayed on a game screen, thereby performing a game process according to the option, unlike in the case of a process of moving the player character in the game space.

In FIG. 14, the CPU core 21 determines whether or not the input level obtained in step 57 is greater than or equal to 3% in step 91. That is, in step 91, the CPU core 21 determines whether or not an effective touch-operation has been performed as a selection of a menu, and when the input is too small, the input is not regarded as effective. If such a determination purpose is satisfied, a threshold value for the determination is not restricted to 3%. In a case where the input level is greater than or equal to 3%, the CPU core 21 advances the process to the next step 92. On the other hand, in a case where the input level is smaller than 3%, the CPU core 21 ends the process according to the subroutine.

In step 92, the CPU core 21 calculates an angle between a direction of the input vector and the reference direction (see FIG. 3) on the touch panel 13. The CPU core 21 determines whether or not another option is present in the direction of the calculated angle in step 93. In the case of the other option being present, the CPU core 21 sets the other option present in the direction, as an option for the player in step 94, and ends the process according to the subroutine. On the other hand, in the case of the other option being not present, the CPU core 21 ends the process according to the subroutine.

Returning to FIG. 10, in step 66, the CPU core 21 performs another process such as controlling a virtual camera positioned in the game space or controlling an opponent character of the player character. Step 66 is not directly related to the present invention, and more detailed description is not given. The CPU core 21 determines whether or not the game is to be ended in step 67. In a case where the game is to be continued, the CPU core 21 returns the process to step 53 and repeats the process. In a case where the game is to be ended, the CPU core 21 ends the process according to the flow chart.

Thus, the game apparatus executing the game program according to the present embodiment provides a section in which an amount of change for the movement distance against an amount of change for the input level is relatively small (operation instruction area Z3), thereby allowing the player to slightly change the movement distance using the touch panel 13. Further, the player can indicate only one game parameter (direction) through the touch-operation using the operation instruction area Z2 formed on the touch panel 13. Moreover, a plurality of modes (the first mode "mode1" and the second mode "mode2") are provided according to a method for controlling the touch panel, thereby obtaining an appropriate game parameter depending on the method for controlling the touch panel. In the process depending on the mode, an input distance can be converted into an input level using a different conversion equation depending on the mode, and the game can be processed based on the input level. That is, the game process is the same between the different modes after the input level is calculated (for example, calculation of the movement distance Mt shown in FIG. 9). Therefore, a plurality of modes for different controllabilities can be realized in the same game process.

In the above description, in order to specifically describe the present embodiment, the respective conversion equations and the threshold values are described using specific numerical values. However, it should be understood that these numerical values are examples, and the numerical values of the present invention are not limited thereto. For example, in a technique for converting the input level into the movement distance, a conversion equation for converting an input level into a value greater than a movement distance into which the input level is converted using a conversion equation used for a certain section is used for another section, thereby achieving the same effect.

Although in the present embodiment a touch panel is used as an input device for the game apparatus 1, another pointing device may be used. Here, the pointing device is an input device for designating an input position or coordinates on a screen. For example, when a mouse, a track pad, a track ball or the like is used as an input means and information concerning a screen coordinate system, which is calculated based on an output value which is outputted by the input means, is used, the present invention can be realized in a similar manner.

In addition, in the present embodiment, the touch panel 13 is integrated into the game apparatus 1. Needless to say, however, also when the game apparatus and the touch panel are separately provided, the exemplary illustrative embodiment presented herein can be realized. Further, although in the present embodiment two display devices are provided, the number of display devices provided can be one. That is, in the present embodiment, it is also possible to provide only the touch panel 13 without the second LCD 12 being provided. In addition, in the present embodiment, the second LCD 12 is not provided and the touch panel 13 may be provided on the upper principal face of the first LCD 11.

Moreover, although in the present embodiment the touch panel 13 is integrated into the game apparatus 1, the touch panel may be used as one of input devices for an information processing apparatus such as a typical personal computer. In this case, a program executed by the computer in the information processing apparatus is not limited to a game program which is typically used for a game, and the program is a general-purpose program which enables the movement distance obtained in the above-described method and the like to be used for a process (for example, moving a cursor and the like) performed in the information processing apparatus.

The storage medium having a game program stored thereon and the game apparatus according to the exemplary illustrative embodiment presented herein enables a player to control a pointing device by using one parameter desired by the player or enabling a player to make a slight adjustment on the pointing device, and are applicable to a game processed using a pointing device and the like.

While the present invention has been described in detail, the foregoing description is in all aspects illustrative and not restrictive. It is understood that numerous other modifications and variations can be devised without departing form the scope of the invention.

What is claimed is:

1. A storage medium having stored thereon a game program executed by a computer in a game apparatus which is operated with a pointing device for outputting coordinate information based on a given coordinate system according to an operation of a player, wherein the game program causes the computer to execute:
reference coordinate setting for setting reference coordinates in the coordinate system;
reference coordinate storage for storing the reference coordinates;
designated coordinate setting for setting designated coordinates in the coordinate system based on the coordinate information outputted by the pointing device;
calculation for calculating a distance and a direction from the reference coordinates to the designated coordinates;
a first game parameter determination for converting, when the distance calculated in the calculation has a value smaller than a predetermined threshold value, the distance into a game parameter using a first conversion function;
a second game parameter determination for converting, when the distance calculated in the calculation has a value greater than the predetermined threshold value, the distance into a game parameter using a second conversion function for converting the distance into a value greater than a value into which the distance is converted using the first conversion function; and
a game process for performing a game process using the direction calculated in the calculation and one of the game parameter determined in the first game parameter determination and the game parameter determined in the second game parameter determination.

2. The storage medium having the game program stored thereon according to claim 1, wherein
when the distance calculated in the calculation has a value smaller than the predetermined threshold value, the first game parameter determination converts the distance calculated in the calculation into zero to determine the game parameter as zero.

3. The storage medium having the game program stored thereon according to claim 1, wherein the game parameter into which the distance calculated in the calculation is converted using the second conversion function, has a greater rate of change per unit distance than the game parameter into which the distance calculated in the calculation is converted using the first conversion function.

4. The storage medium having the game program stored thereon according to claim 1, wherein
the first conversion function used in the first game parameter determination is a function for multiplying the distance calculated in the calculation by a first positive value, thereby converting the distance into the game parameter, and
the second conversion function used in the second game parameter determination is a function for multiplying the distance calculated in the calculation step by a second positive value greater than the first positive value, thereby converting the distance in the game parameter.

5. The storage medium having the game program stored thereon according to claim 1, wherein
the first conversion function used in the first game parameter determination is a function for multiplying the distance calculated in the calculation by a first positive value, thereby converting the distance into the game parameter, and
the second conversion function used in the second game parameter determination is a function for adding a value obtained by multiplying the threshold value by the first positive value to a value obtained by multiplying a second positive value greater than the first positive value by a value obtained by subtracting the threshold value from the distance calculated in the calculation, thereby converting the distance into the game parameter.

6. The storage medium having the game program stored thereon according to claim 1, wherein
the game process determines a movement speed of a game object appearing in a virtual game space according to the game parameter.

7. The storage medium having the game program stored thereon according to claim 1, wherein
the game process determines a direction of a game object appearing in a virtual game space according to the direction calculated in the calculation step.

8. The storage medium having the game program stored thereon according to claim 1, wherein
the reference coordinate setting sets, as the reference coordinates, designated coordinates which are initially set in the designated coordinate setting.

9. The storage medium having the game program stored thereon according to claim 2, wherein
the game process performs the process using both the game parameter into which the distance is converted and the direction calculated in the calculation when the distance calculated in the calculation has a value greater than the predetermined threshold value, and
the game process performs the process using only the direction calculated in the calculation when the distance calculated in the calculation has a value smaller than the predetermined threshold value.

10. A game apparatus which is operated using a pointing device for outputting coordinate information based on a given coordinate system according to an operation of a player, the game apparatus comprising:
reference coordinate setting programmed logic circuitry for setting reference coordinates in the coordinate system;
reference coordinate storage programmed logic circuitry for storing the reference coordinates;
designated coordinate setting programmed logic circuitry for setting designated coordinates in the coordinate system based on the coordinate information outputted by the pointing device;
calculation programmed logic circuitry for calculating a distance and a direction from the reference coordinates to the designated coordinates;
first game parameter determination programmed logic circuitry for converting, when the distance calculated by the calculation programmed logic circuitry has a value smaller than a predetermined threshold value, the distance into a game parameter using a first conversion function;
second game parameter determination programmed logic circuitry for converting, when the distance calculated by the calculation programmed logic circuitry has a value greater than the predetermined threshold value, the distance into a game parameter using a second conversion function for converting the distance into a value greater than a value into which the distance is converted using the first conversion function; and
game process programmed logic circuitry for performing a game process using the direction calculated by the calculation programmed logic circuitry and one of the game parameter determined by the first game parameter determination programmed logic circuitry and the game parameter determined by the second game parameter determination programmed logic circuitry.

11. A storage medium having stored thereon a program executed by a computer in an information processing apparatus which is operated with a pointing device for outputting coordinate information based on a given coordinate system according to an operation of a user, wherein
the program causes the computer to execute:
reference coordinate setting for setting reference coordinates in the coordinate system;
reference coordinate storage for storing the reference coordinates;
designated coordinate setting for setting designated coordinates in the coordinate system based on the coordinate information outputted by the pointing device;
calculation for calculating a distance and a direction from the reference coordinates to the designated coordinates;
a first parameter determination for converting, when the distance calculated in the calculation has a value smaller than a predetermined threshold value, the distance into a parameter using a first conversion function;
a second parameter determination for converting, when the distance calculated in the calculation has a value greater than the predetermined threshold value, the distance into a parameter using a second conversion function for converting the distance into a value greater than a value into which the distance is converted using the first conversion function; and
an operation process for processing an operation using the direction calculated in the calculation and one of the parameter determined in the first parameter determination and the parameter determined in the second parameter determination.

* * * * *